(12) United States Patent
Woo et al.

(10) Patent No.: US 10,028,223 B2
(45) Date of Patent: Jul. 17, 2018

(54) METHOD OF RECEIVING SIGNAL BASED ON SIGNAL QUALITY IN DEVICE TO DEVICE (D2D) COMMUNICATION

(71) Applicant: LG ELECTRONICS INC., Seoul (KR)

(72) Inventors: Kyungsoo Woo, Seoul (KR); Changhwan Park, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 14/812,728

(22) Filed: Jul. 29, 2015

(65) Prior Publication Data

US 2017/0034783 A1 Feb. 2, 2017

(51) Int. Cl.
*H04W 52/02* (2009.01)
*H04L 5/00* (2006.01)
*H04W 4/70* (2018.01)
*H04L 12/26* (2006.01)
*H04W 92/18* (2009.01)
*H04W 72/08* (2009.01)

(52) U.S. Cl.
CPC ....... *H04W 52/0245* (2013.01); *H04L 5/0021* (2013.01); *H04W 4/70* (2018.02); *H04L 43/16* (2013.01); *H04W 72/08* (2013.01); *H04W 92/18* (2013.01); *Y02D 70/00* (2018.01); *Y02D 70/1242* (2018.01); *Y02D 70/1262* (2018.01); *Y02D 70/1264* (2018.01); *Y02D 70/21* (2018.01); *Y02D 70/23* (2018.01)

(58) Field of Classification Search
CPC .. Y02B 60/50; H04W 52/0245; H04W 4/005; H04W 76/023; H04W 8/005; H04W 72/0446; H04W 92/18; H04W 72/0413; H04W 72/08; H04W 24/10; H04W 72/02; H04W 72/085; H04W 56/001; H04W 4/70; H04W 76/23; H04W 24/08; H04W 88/06; H04W 88/02; H04W 24/02; H04W 72/1226; H04L 5/0021; H04L 43/16; H04L 5/0048; H04L 5/0053; H04L 5/006; H04B 17/318; Y02D 70/1262; Y02D 70/1264; Y02D 70/23; Y02D 70/21; Y02D 70/00

See application file for complete search history.

(56) References Cited

U.S. PATENT DOCUMENTS

2013/0322276 A1* 12/2013 Pelletier .............. H04W 72/085
370/252
2014/0185530 A1* 7/2014 Kuchibhotla ....... H04W 76/023
370/329

(Continued)

*Primary Examiner* — Paul H Masur
*Assistant Examiner* — Michael K Phillips
(74) *Attorney, Agent, or Firm* — Birch, Stewart, Kolasch & Birch, LLP

(57) ABSTRACT

One disclosure of the present specification provides a method of receiving a signal based on signal quality in a device to device (D2D) communication. The method may include: receiving a signal from the other terminal; measuring signal quality for each of a plurality of physical resource block (PRB) regions included in a frequency region in which the signal can be received; choosing a candidate PRB region for which demodulation is performed among the plurality of PRB regions on the basis of the measured signal quality; and performing demodulation on the candidate PRB region.

8 Claims, 13 Drawing Sheets

(56) References Cited

U.S. PATENT DOCUMENTS

| | | | |
|---|---|---|---|
| 2014/0321314 A1* | 10/2014 | Fodor | H04W 72/085 370/252 |
| 2015/0117295 A1* | 4/2015 | Yeh | H04W 76/023 370/312 |
| 2015/0146633 A1* | 5/2015 | Kalhan | H04L 1/1607 370/329 |
| 2015/0264551 A1* | 9/2015 | Ko | H04W 8/005 370/329 |
| 2016/0095092 A1* | 3/2016 | Khoryaev | H04W 8/005 370/329 |
| 2016/0100419 A1* | 4/2016 | Wang | H04W 72/1231 370/329 |
| 2016/0204885 A1* | 7/2016 | Sorrentino | H04W 72/04 455/67.11 |
| 2017/0006563 A1* | 1/2017 | Lindoff | H04W 56/001 |
| 2017/0126338 A1* | 5/2017 | Zaidi | H04B 17/318 |

* cited by examiner

FIG. 7B
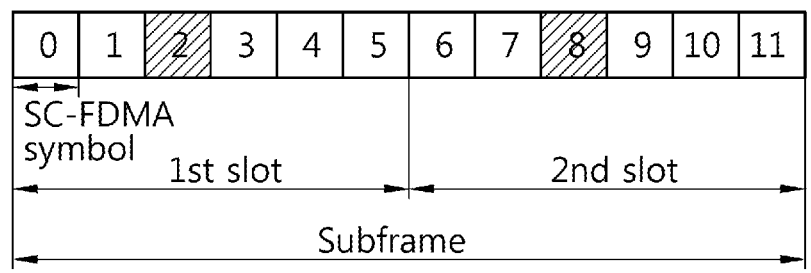
  DM-RS

METHOD OF RECEIVING SIGNAL BASED ON SIGNAL QUALITY IN DEVICE TO DEVICE (D2D) COMMUNICATION

BACKGROUND OF THE INVENTION

Field of the Invention

The present invention relates to mobile communications.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, with the introduction of a mobile terminal (e.g., a smart phone, a table PC, etc.) which is highly portable and has excellent performance, there is a growing interest on a device-to-device (D2D) communication. The D2D communication refers to a direct communication between terminals without via a base station or an access point (AP). Therefore, the D2D communication is also called a direct communication or a communication between terminals. The D2D communication can improve service quality for a user while decreasing a load on a core network.

If the D2D communication is also supported in a physical (PHY) layer and medium access control (MAC) layer of a user terminal, unlike in an infrastructure communication environment, data can be transmitted and/or received between user terminals directly without via a server in the D2D communication. That is, since data for the D2D communication is directly transmitted between the user terminals without via the server, communication resources can be more effectively used.

Further, if the D2D communication is also supported in the PHY layer and MAC layer of the user terminal, a transmission delay is relatively decreased, and since transmission is achieved in a relatively near distance, transmission power can also be saved. In addition thereto, since a connection is not required between the user terminal and the server, massive data can be transmitted to other user terminals without an accounting burden when data is used from a user's perspective.

In such a D2D communication environment, a communication is performed between user terminals without the aid of a base station or an AP. Therefore, a PHY layer and MAC layer for the D2D communication must be designed by considering resource distribution, interference avoidance, synchronization acquisition, or the like for the D2D communication.

Meanwhile, in the D2D communication, a user equipment (UE) or terminal for transmitting a D2D signal (hereinafter, D2D Tx UE) may transmit a discovery signal or a scheduling assignment (SA) signal, which is a signal for assigning scheduling, to a UE or terminal for receiving the D2D signal (hereinafter, D2D Rx UE).

In this case, since the D2D Rx UE performs blind decoding in all frequency regions in which the discovery signal or the SA signal can exist, there may be a problem in that an unnecessary computation results in an increase in complexity and an increase in power consumption.

SUMMARY OF THE INVENTION

Accordingly, a disclosure of the present specification aims to solve the aforementioned problem.

In order to achieve the aforementioned aim, a method of receiving a signal by a terminal for performing a device to device (D2D) communication according to one disclosure of the present specification may include: receiving a signal from the other terminal; measuring signal quality for each of a plurality of physical resource block (PRB) regions included in a frequency region in which the signal can be received; choosing a candidate PRB region for which demodulation is performed among the plurality of PRB regions on the basis of the measured signal quality; and performing demodulation on the candidate PRB region.

Herein, the candidate region may be a PRB region having signal quality greater than or equal to a threshold among the plurality of PRB regions.

In addition, the signal may be a discovery signal or scheduling assignment (SA) signal used in the D2D communication.

In addition, the demodulation on the candidate PRB region may be performed on the basis of single carrier frequency division multiple access (SC-FDMA).

In addition, the method may further include performing fast Fourier transform (FFT) on the received signal.

In addition, the signal quality for each of the plurality of PRB regions may be measured on the basis of signal strength of the received signal for each of the plurality of PRB regions, a least square (LS) channel estimation scheme, or signal strength of an estimated channel.

In order to achieve the aforementioned aim, a terminal for performing a D2D communication according to one disclosure of the present specification may include: a radio frequency (RF) unit for receiving a signal from the other terminal; and a processor for measuring signal quality for each of a plurality of physical resource block (PRB) regions included in a frequency region in which the signal can be received, for choosing a candidate PRB region for which demodulation is performed among the plurality of PRB regions on the basis of the measured signal quality, and for performing demodulation on the candidate PRB region.

BRIEF DESCRIPTION OF THE DRAWINGS

FIGS. 7a and 7b show an exemplary structure of a subframe in which an RS is transmitted.

DESCRIPTION OF EXEMPLARY EMBODIMENTS

Figure 1:
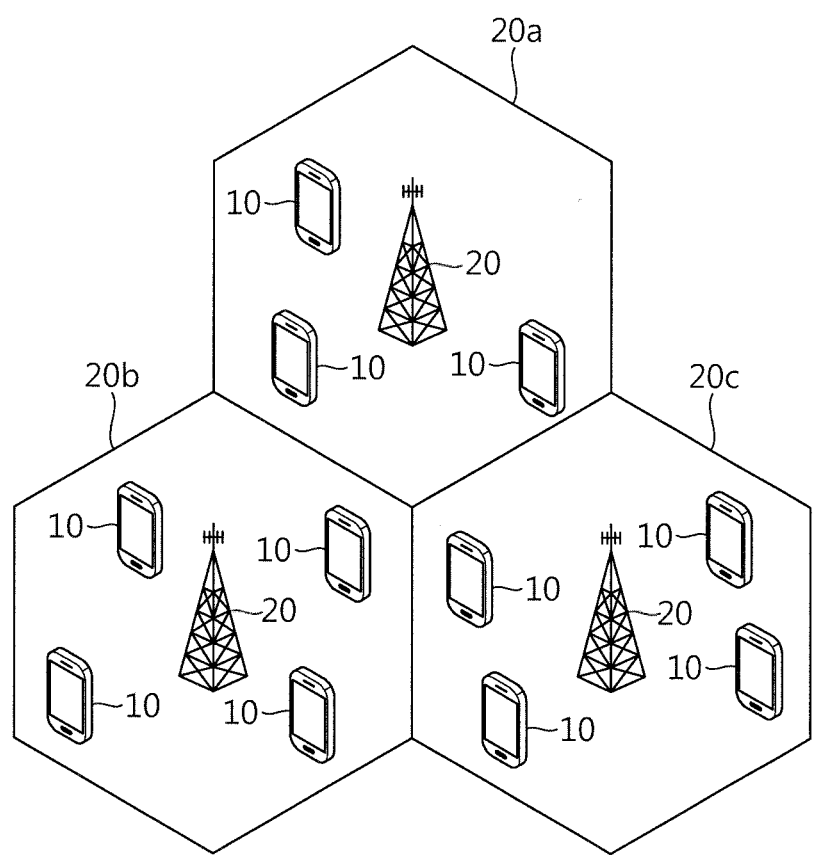
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

Meanwhile, the LTE system defined by the 3GPP adopted such MIMO. Hereinafter, the LTE system is described in further detail.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors). A terminal (user equipment, UE) 10 may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like. The base station 20 generally represents a fixed station that communicates with the terminal 10, and may be called different terms such as an evolved-NodeB (eNB), a base transceiver system (BTS), an access point, and the like.

The terminal generally belongs to one cell and the cell to which the terminal belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD)

type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Figure 2:
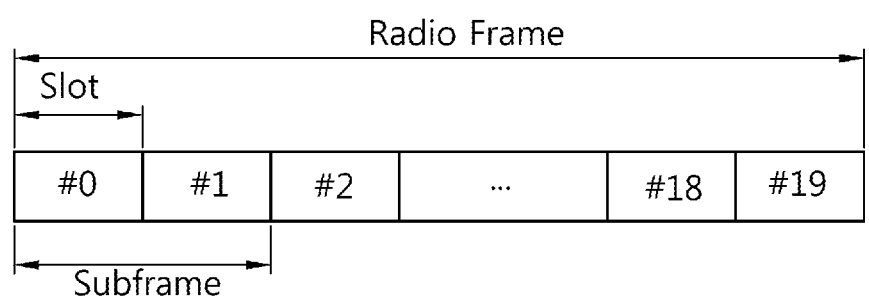
FIG. 2 shows a structure of a radio frame in 3GPP LTE.

FIG. 2 shows a structure of a radio frame in 3GPP LTE.

Referring to FIG. 2, a radio frame includes 10 subframes. One subframe is defined as two consecutive slots. A time required for transmitting one subframe is called a transmission time interval (TTI). A time length of the radio frame is $T_f=307200*T_s=10$ ms, and consists of 20 slots. A time length of the slot is $T_{slot}=15360*T_s=0.5$ ms, and is numbered from 0 to 19. In frequency division duplex (FDD), a downlink in which each node or BS transmits a signal to a UE and an uplink in which the UE transmits a signal to each node or BS are divided in a frequency domain. In time division duplex (TDD), a downlink and an uplink can use the same frequency band between each node (or BS) and the UE, and can be divided in a time domain.

Figure 3:
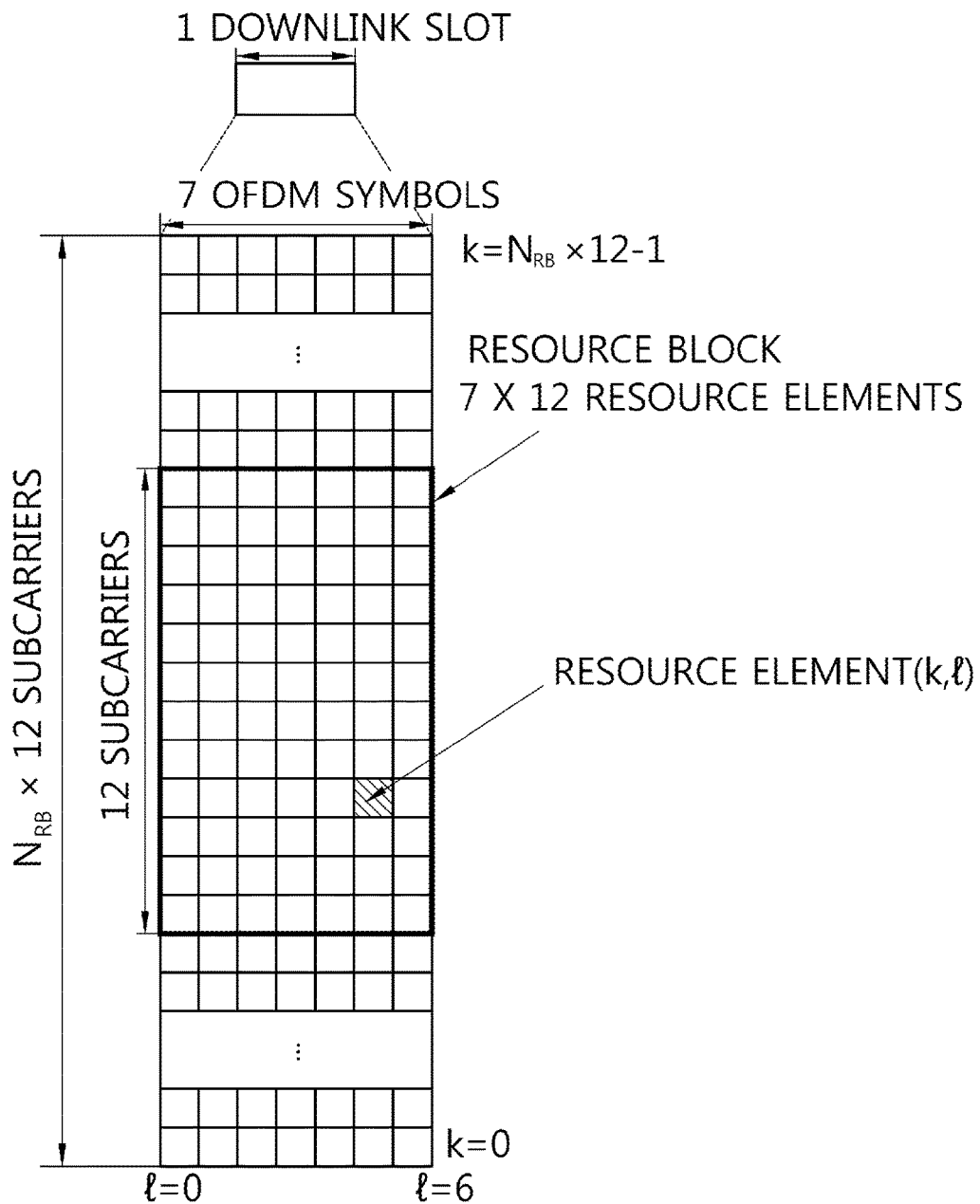
FIG. 3 shows an example of a resource grid for one slot.

FIG. 3 shows an example of a resource grid for one slot.

Referring to FIG. 3, one slot includes a plurality of orthogonal frequency-division multiplexing (OFDM) symbols in a time domain, and includes $N_{RB}$ resource blocks in a frequency domain. Herein, one slot includes 7 OFDMA symbols, and one resource block (RB) includes 12 subcarriers in the frequency domain. However, this is for exemplary purposes only, and thus the present invention is not limited thereto.

Each element on the resource grid is referred to as a resource element (RE). The RE on the resource grid can be identified by an index pair (k,l) within the slot. Herein, k (k=0, . . . , $N_{RB}\times 12-1$) denotes a subcarrier index in the frequency domain, and l (l=0, . . . , 6) denotes an OFDM symbol index in the time domain.

The number $N^{DL}$ of RBs included in a downlink slot depends on a downlink transmission bandwidth determined in a cell.

Figure 4:
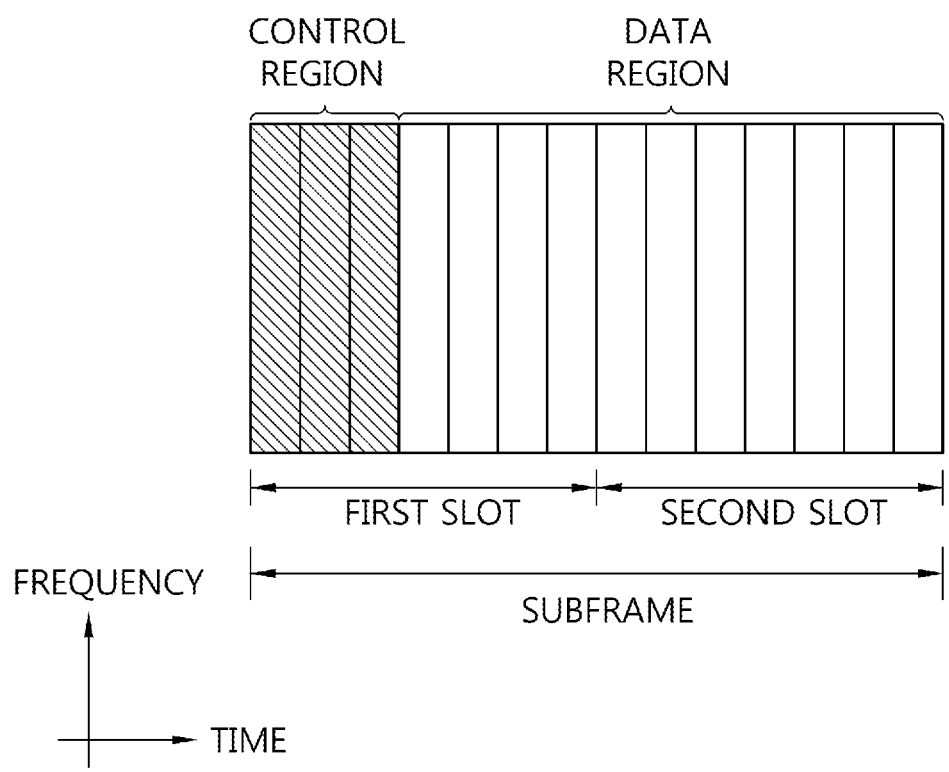
FIG. 4 shows a structure of a downlink subframe.

FIG. 4 shows a structure of a downlink subframe.

Referring to FIG. 4, the downlink subframe is divided into a control region and a data region in a time domain. The control region includes up to first four OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, 3GPP LTE/LTE-A classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the downlink subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of a possible PDCCH are determined.

One REG includes 4 REs. one CCE includes 9 REGs. The number of CCEs used to configure one PDCCH may be selected from a set $\{1, 2, 4, 8\}$. Each element of the set $\{1, 2, 4, 8\}$ is referred to as a CCE aggregation level.

The BS determines the number of CCEs used in transmission of the PDCCH according to a channel state. For example, a UE having a good downlink channel state can use one CCE in PDCCH transmission. A UE having a poor downlink channel state can use 8 CCEs in PDCCH transmission.

A control channel consisting of one or more CCEs performs interleaving in an REG unit, and is mapped to a physical resource after performing cyclic shift based on a cell identifier (ID).

Figure 5:
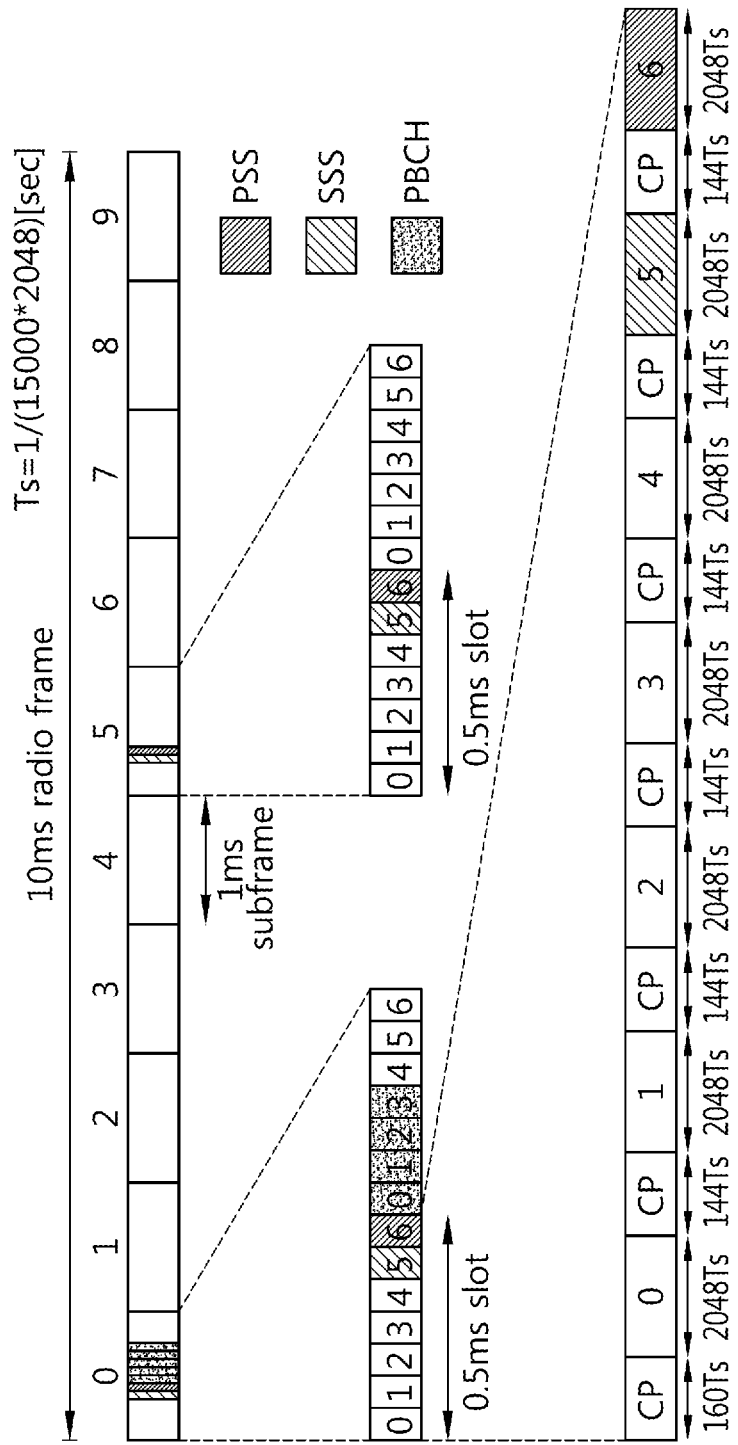
FIG. 5 shows an OFDM symbol for transmitting a synchronization signal and a PBCH within a radio frame in a frequency division duplex (FDD) system.

FIG. 5 shows an OFDM symbol for transmitting a synchronization signal and a PBCH within a radio frame in a frequency division duplex (FDD) system.

Referring to FIG. 5, a primary synchronization signal (PSS) is transmitted through last OFDM symbols of a slot #0 and a slot #10 within a frame. The same PSS is transmitted using 2 OFDM symbols. The PSS is used to obtain time domain synchronization such as OFDM symbol synchronization, slot synchronization, or the like and/or frequency domain synchronization. A Zadoff-Chu (ZC) sequence can be used as the PSS. At least one PSS exists in a wireless communication system.

A secondary synchronization signal (SSS) is transmitted through an immediately previous OFDM symbol from the last OFDM symbols of the slot #0 and the slot #10 within the frame. That is, the SSS and the PSS can be transmitted through contiguous OFDM symbols. In addition, different SSSs are transmitted through two OFDM symbols being transmitted. The SSS is used to obtain frame synchronization and/or cyclic prefix (CP) configuration of a cell, i.e., usage information of a normal CP or an extended CP. An m-sequence may be used as the SSS. One OFDM symbol includes two m-sequences. For example, if one OFDM symbol includes 63 subcarriers, two m-sequences each having a length of 31 are mapped to one OFDM symbol.

If a physical cell ID is denoted by $N^{cell}_{ID}$, then $N^{cell}_{ID}$ can be obtained by Equation 1 below $$N^{cell}_{ID}=3N^{(1)}_{ID}+N^{(2)}_{ID} \quad \text{<Equation 1>}$$

Herein, $N^{(2)}_{ID}$ denotes a physical layer ID as one of values ranges from 0 to 2, and is obtained by using the PSS. $N^{(1)}_{ID}$ denotes a cell group ID as one of values ranges from 0 to 167, and is obtained by using the SSS.

A physical broadcast channel (PBCH) is located at a subframe 0 (i.e., a $1^{st}$ subframe) of a radio frame in a time domain. For example, the PBCH can be transmitted in a $2^{nd}$ slot of the subframe 0, i.e., first four OFDM symbols (i.e., from an OFDM symbol 0 to an OFDM symbol 3) of a slot 1. The PBCH can be transmitted by using the 72 consecutive subcarriers in a frequency domain. The PBCH carries a limited number of parameters which are most frequently transmitted and are essential for initial cell access. A master information block (MIB) includes these essential parameters. In the PBCH, each MIB transmission is spread with a period of 40 ms. That is, transmission is performed in four consecutive frames. This is to avoid missing of one entire MIB.

Figure 6:
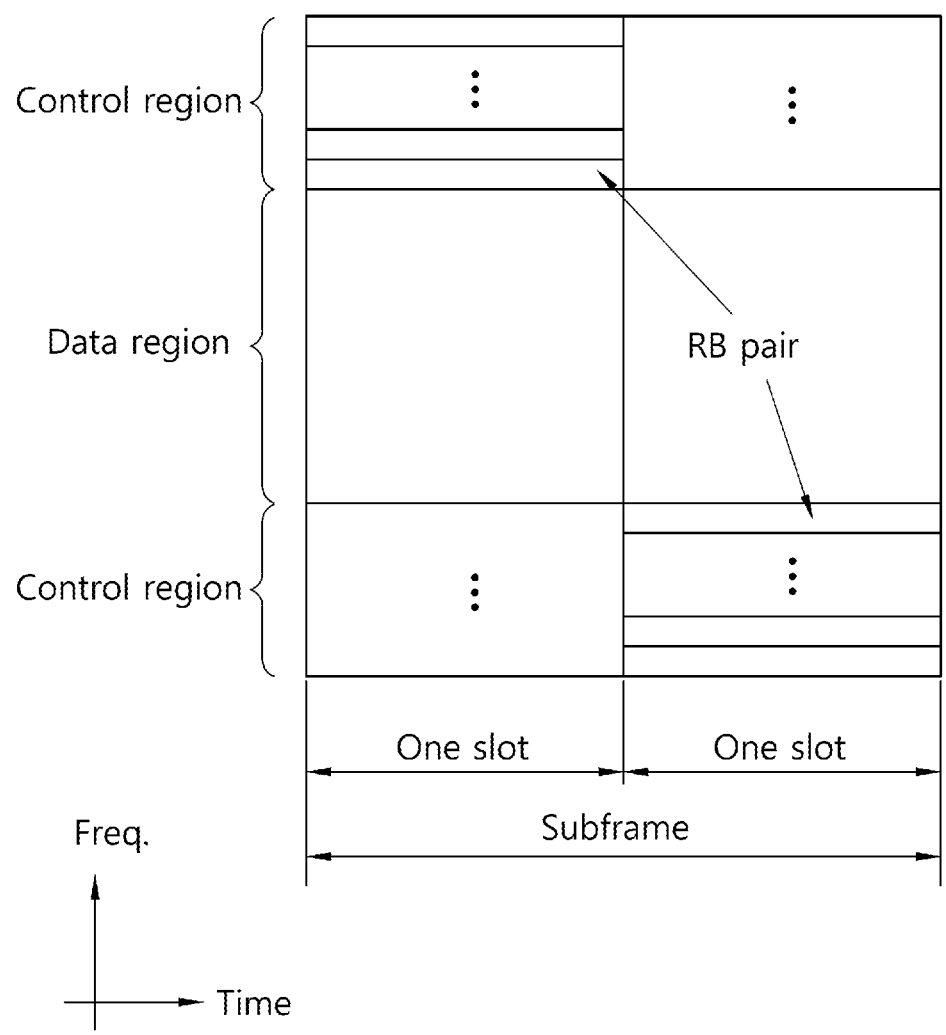
FIG. 6 shows a structure of an uplink subframe.

FIG. 6 shows a structure of an uplink subframe.

Referring to FIG. 6, the uplink subframe can be divided into a control region and a data region. A physical uplink control channel (PUCCH) for carrying uplink control information (UCI) is allocated to the control region. A physical uplink shared channel (PUSCH) for carrying UL data and/or the UCI is allocated to the data region. In this sense, the control region can be called a PUCCH region, and the data region can be called a PUSCH region. According to configuration information indicated by a higher layer, a UE may support simultaneous transmission of the PUSCH and the PUCCH or may not support simultaneous transmission of the PUSCH and the PUCCH.

The PUSCH is mapped to an uplink shared channel (UL-SCH) which is a transport channel. UL data transmitted on the PUSCH may be a transport block which is a data block for the UL-SCH transmitted during TTI. The transport block may be user information. Alternatively, the uplink data may be multiplexed data. The multiplexed data may be attained by multiplexing control information and the transport block for the UL-SCH. Examples of the UCI to be multiplexed to the uplink data include a channel quality indicator (CQI), a precoding matrix indicator (PMI), a hybrid automatic repeat request (HARQ) acknowledgement/not-acknowledgement (ACK/NACK), a rank indicator (RI), a precoding type indication (PTI), etc. As such, when the UCI is transmitted in the data region together with the uplink data, it is called piggyback transmission of the UCI. Only the UCI may be transmitted through the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at the slot boundary. Since the UE transmits UCI on a time basis through different subcarriers, a frequency diversity gain can be obtained.

The UE generates a PUSCH signal through a process of scrambling, modulation, mapping to a transport layer, precoding, mapping to a resource element, generating of an SC-FDMA signal. In this case, a sequence used in the scrambling is generated based on a UE-specific ID (i.e., an RNTI for the UE), and a physical cell ID.

Hereinafter, an uplink reference signal (RS) will be described.

In general, an RS is transmitted as a sequence. Any sequence can be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Example of the PN sequence include an m-sequence, a computer generated sequence, a gold sequence, a Kasami sequence, etc. In addition, the RS sequence may be a cyclically-shifted sequence.

The uplink RS can be classified into a demodulation reference signal (DM-RS) and a sounding reference signal (SRS). The DM-RS is an RS used for channel estimation to demodulate a received signal. The DM-RS can be combined with PUSCH or PUCCH transmission. The SRS is an RS transmitted for uplink scheduling by a UE to a BS. The BS estimates an uplink channel by using the received SRS, and the estimated uplink channel is used in uplink scheduling. The SRS is not combined with PUSCH or PUCCH transmission. The same type of base sequences can be used for the DM-RS and the SRS. Meanwhile, precoding applied to the DM-RS in uplink multi-antenna transmission may be the same as precoding applied to the PUSCH. Cyclic shift separation is a primary scheme for multiplexing the DM-RS. In a 3GPP LTE-A system, the SRS may not be precoded, and may be an antenna-specific RS.

An RS sequence $r_{u,v}^{(\alpha)}(n)$ can be defined based on a base sequence $b_{u,v}(n)$ and a cyclic shift $\alpha$ according to Equation 2.

$$r_{u,v}^{(\alpha)}(n)=e^{j\alpha n}b_{u,v}(n), 0\leq n \leq M_{sc}^{RS} \quad \text{<Equation 2>}$$

In Equation 2, $M_{sc}^{RS}$ ($1\leq m \leq N_{RB}^{max,UL}$) denotes an RS sequence length, where $M_{sc}^{RB}=m*N_{sc}^{RB}$. $N_{sc}^{RB}$ denotes a size of a resource block represented by the number of subcarriers in a frequency domain. $N_{RB}^{max,UL}$ denotes a maximum value of an uplink bandwidth expressed by a multiple of $N_{sc}^{RB}$. A plurality of RS sequences can be defined by differently applying a cyclic shift value α from one base sequence.

The base sequence is divided into a plurality of groups. In this case, u∈{0, 1, ..., 29} denotes a group index, and v denotes a base sequence index in a group. The base sequence depends on a base sequence length $M_{sc}^{RS}$. Each group includes one base sequence (i.e., v=0) having a length of $M_{sc}^{RS}$ with respect to m (where and includes two base sequences (i.e., v=0,1) having a length of $M_{sc}^{RS}$ with respect to m (where $6 \leq m \leq n_{RB}^{max,UL}$). The sequence group index u and the base sequence index v may vary over time similarly to group hopping or sequence hopping to be described below.

In addition, if the RS sequence has a length greater than or equal to $3N_{sc}^{RB}$, the base sequence can be defined by Equation 3.

$$b_{u,v}(n) = x_q(n \bmod N_{ZC}^{RS}), 0 \leq n < M_{sc}^{RS} \quad \text{<Equation 3>}$$

In Equation 3, q denotes a root index of a Zadoff-Chu (ZC) sequence. $N_{ZC}^{RS}$ denotes a length of the ZC sequence, and may be given to a maximum prime number less than $M_{sc}^{RS}$. The ZC sequence with the root index q can be defined by Equation 4.

$$x_q(m) = e^{-j\frac{\pi q m(m+1)}{N_{ZC}^{RS}}}, \quad 0 \leq m \leq N_{ZC}^{RS} - 1 \quad \text{<Equation 4>}$$

q can be given by Equation 5.

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31 \quad \text{<Equation 5>}$$

If the length of the RS sequence is less than or equal to $3N_{sc}^{RB}$, the base sequence can be defined by Equation 6.

$$b_{u,v}(n) = e^{j\phi(n)\pi/4}, 0 \leq n \leq M_{sc}^{RS} - 1 \quad \text{<Equation 6>}$$

Table 1 shows an example of defining φ(n) when $M_{sc}^{RS} = N_{sc}^{RB}$.

TABLE 1

| u | φ(0), ..., φ(11) | | | | | | | | | | | |
|---|---|---|---|---|---|---|---|---|---|---|---|---|
| 0  | -1 | 1  | 3  | -3 | 3  | 3  | 1  | 1  | 3  | 1  | -3 | 3  |
| 1  | 1  | 1  | 3  | 3  | 3  | -1 | 1  | -3 | -3 | 1  | -3 | 3  |
| 2  | 1  | 1  | -3 | -3 | -3 | -1 | -3 | -3 | 1  | -3 | 1  | -1 |
| 3  | -1 | 1  | 1  | 1  | 1  | -1 | -3 | -3 | 1  | -3 | 3  | -1 |
| 4  | -1 | 3  | 1  | -1 | 1  | -1 | -3 | -1 | 1  | -1 | 1  | 3  |
| 5  | 1  | -3 | 3  | -1 | -1 | 1  | 1  | -1 | -1 | 3  | -3 | 1  |
| 6  | -1 | 3  | -3 | -3 | -3 | 3  | 1  | -1 | 3  | 3  | -3 | 1  |
| 7  | -3 | -1 | -1 | -1 | 1  | -3 | 3  | -1 | 1  | -3 | 3  | 1  |
| 8  | 1  | -3 | 3  | 1  | -1 | -1 | -1 | 1  | 1  | 3  | -1 | 1  |
| 9  | 1  | -3 | -1 | 3  | 3  | -1 | -3 | 1  | 1  | 1  | 1  | 1  |
| 10 | -1 | 3  | -1 | 1  | 1  | -3 | -3 | -1 | -3 | -3 | 3  | -1 |
| 11 | 3  | 1  | -1 | -1 | 3  | 3  | -3 | 1  | 3  | 1  | 3  | 3  |
| 12 | 1  | -3 | 1  | 1  | -3 | 1  | 1  | 1  | -3 | -3 | -3 | 1  |
| 13 | 3  | 3  | -3 | 3  | -3 | 1  | 1  | 3  | -1 | -3 | 3  | 3  |
| 14 | -3 | 1  | -1 | -3 | -1 | 3  | 1  | 3  | 3  | 3  | -1 | 1  |
| 15 | 3  | -1 | 1  | -3 | -1 | -1 | 1  | 1  | 3  | 1  | -1 | -3 |
| 16 | 1  | 3  | 1  | -1 | 1  | 3  | 3  | 3  | -1 | -1 | 3  | -1 |
| 17 | -3 | 1  | 1  | 3  | -3 | 3  | -3 | -3 | 3  | 1  | 3  | -1 |
| 18 | -3 | 3  | 1  | 1  | -3 | 1  | -3 | -3 | -1 | -1 | 1  | -3 |
| 19 | -1 | 3  | 1  | 3  | 1  | -1 | -1 | 3  | -3 | -1 | -3 | -1 |
| 20 | -1 | -3 | 1  | 1  | 1  | 1  | 3  | 1  | -1 | 1  | -3 | -1 |
| 21 | -1 | 3  | -1 | 1  | -3 | -3 | -3 | -3 | -3 | 1  | -1 | -3 |
| 22 | 1  | 1  | -3 | -3 | -3 | -3 | -1 | 3  | -3 | 1  | -3 | 3  |
| 23 | 1  | 1  | -1 | -3 | -1 | -3 | 1  | -1 | 1  | 3  | -1 | 1  |
| 24 | 1  | 1  | 3  | 1  | 3  | 3  | -1 | 1  | -1 | -3 | -3 | 1  |
| 25 | 1  | -3 | 3  | 3  | 1  | 3  | 3  | 1  | -3 | -1 | -1 | 3  |
| 26 | 1  | 3  | -3 | -3 | 3  | -3 | 1  | -1 | -1 | 3  | -1 | -3 |
| 27 | -3 | -1 | -3 | -1 | -3 | 3  | 1  | -1 | 1  | 3  | -3 | -3 |
| 28 | -1 | 3  | -3 | 3  | -1 | 3  | 3  | -3 | 3  | 3  | -1 | -1 |
| 29 | 3  | -3 | -3 | -1 | -1 | -3 | -1 | 3  | -3 | 3  | 1  | -1 |

Table 2 shows an example of defining φ(n) when $M_{sc}^{RS} = 2 \cdot N_{sc}^{RB}$.

TABLE 2

| u | φ(0), ..., φ(23) | | | | | | | | | | | | | | | | | | | | | | | |
|---|---|---|---|---|---|---|---|---|---|---|---|---|---|---|---|---|---|---|---|---|---|---|---|---|
| 0  | -1 | 3  | 1  | -3 | 3  | -1 | 1  | 3  | -3 | 3  | 1  | 3  | -3 | 3  | 1  | 1  | -1 | 1  | 3  | -3 | 3  | -3 | -1 | -3 |
| 1  | -3 | 3  | -3 | -3 | -3 | 1  | -3 | -3 | 3  | -1 | 1  | 1  | 1  | 3  | 1  | -1 | 3  | -3 | -3 | 1  | 3  | 1  | 1  | -3 |
| 2  | 3  | -1 | 3  | 3  | 1  | 1  | -3 | 3  | 3  | 3  | 3  | 1  | -1 | 3  | -1 | 1  | 1  | -1 | -3 | -1 | -1 | 1  | 3  | 3  |
| 3  | -1 | -3 | 3  | 1  | 1  | -3 | 1  | -3 | -3 | 1  | -3 | -1 | -1 | 3  | -3 | 3  | 3  | 3  | -1 | 3  | 1  | 1  | -3 | -3 |
| 4  | -1 | -1 | -1 | -3 | -3 | -1 | 1  | 1  | 3  | 3  | -1 | 3  | -1 | 1  | -1 | -3 | 1  | -1 | -3 | -3 | 1  | -3 | -1 | -1 |
| 5  | -3 | 1  | 1  | 3  | -1 | 1  | 3  | 1  | -3 | 1  | -3 | 1  | 1  | -1 | -1 | 3  | -1 | -3 | 3  | -3 | -3 | -3 | 1  | 1  |
| 6  | 1  | 1  | -1 | -1 | 3  | -3 | -3 | 3  | -3 | 1  | -1 | -1 | 1  | -1 | 1  | 1  | -1 | -3 | -1 | 1  | -1 | 3  | -1 | -3 |
| 7  | -3 | 3  | 3  | -1 | -1 | -3 | -1 | 3  | 1  | 3  | 1  | 3  | 1  | 1  | -1 | 3  | 1  | -1 | 1  | 3  | -3 | -1 | -1 | 1  |
| 8  | -3 | 1  | 3  | -3 | 1  | -1 | -3 | 3  | -3 | 3  | -1 | -1 | -1 | -1 | 1  | -3 | -3 | -3 | 1  | -3 | -3 | -3 | 1  | -3 |
| 9  | 1  | 1  | -3 | 3  | 3  | -1 | -3 | -1 | 3  | -3 | 3  | 3  | 3  | -1 | 1  | 1  | -3 | 1  | -1 | 1  | 1  | -3 | 1  | 1  |
| 10 | -1 | 1  | -3 | -3 | 3  | -1 | 3  | -1 | -1 | -3 | -3 | -3 | -1 | -3 | -3 | 1  | -1 | 1  | 3  | 3  | -1 | 1  | -1 | 3  |
| 11 | 1  | 3  | 3  | -3 | -3 | 1  | 3  | 1  | -1 | -3 | -3 | -3 | 3  | 3  | -3 | 3  | 3  | -1 | -3 | 3  | -1 | 1  | -3 | 1  |
| 12 | 1  | 3  | 3  | 1  | 1  | 1  | -1 | -1 | 1  | -3 | 3  | -1 | 1  | 1  | -3 | 3  | 3  | -1 | -3 | 3  | -3 | -1 | -3 | -1 |
| 13 | 3  | -1 | -1 | -1 | -1 | -3 | -1 | 3  | 3  | 1  | -1 | 1  | 3  | 3  | -1 | 1  | 1  | 3  | -1 | -3 | 3  | 1  | -3 | 3  |
| 14 | -3 | -3 | 3  | 1  | 3  | 1  | 3  | 1  | 1  | 3  | 3  | -1 | -1 | -3 | 1  | -3 | -1 | 3  | 1  | 1  | 3  |    |    |    |
| 15 | -1 | -1 | 1  | -3 | 1  | 3  | -3 | 1  | -1 | -3 | -1 | 3  | 1  | -3 | -3 | -1 | -1 | -3 | -3 | -3 | -1 |    |    |    |
| 16 | -1 | -3 | 1  | -1 | -1 | -1 | 1  | -1 | -3 | 3  | 1  | 3  | 3  | 1  | -1 | 1  | -3 | 1  | 1  | -3 | -1 |    |    |    |
| 17 | 1  | 3  | -1 | 3  | 3  | -1 | -3 | 1  | -1 | 3  | 3  | 3  | -1 | 1  | 1  | 3  | -1 | -3 | -1 | 3  | -1 | -1 | -1 | 1  |
| 18 | 1  | 1  | 1  | 1  | 1  | -1 | 3  | -1 | -3 | 1  | 1  | 3  | -3 | 1  | -3 | -1 | 1  | 1  | -3 | -3 | 3  | 1  | 1  | -3 |
| 19 | 1  | 3  | 3  | 1  | -1 | -3 | 3  | -1 | 3  | 3  | 3  | -3 | 1  | -1 | 1  | -1 | -3 | -1 | 1  | 3  | -1 | 3  | -3 | -3 |
| 20 | -1 | -3 | 3  | -3 | -3 | -3 | -1 | -1 | -3 | -1 | -3 | 3  | 1  | 3  | -3 | -1 | 3  | -1 | 1  | -1 | 3  | -3 | 1  | -1 |
| 21 | -3 | -3 | 1  | 1  | -1 | 1  | -1 | 1  | -1 | 3  | 1  | -3 | -1 | 1  | -1 | 1  | -1 | -1 | 3  | 3  | -3 | -1 | 1  | -3 |
| 22 | -3 | -1 | -3 | 3  | 1  | -1 | -3 | -1 | -3 | -3 | 3  | -3 | 3  | -3 | -1 | 1  | 3  | 1  | -3 | 1  | 3  | 3  | -1 | -3 |
| 23 | -1 | -1 | -1 | -1 | 3  | 3  | 3  | 1  | 3  | 3  | -3 | 1  | 3  | -1 | 3  | -1 | 3  | 3  | -3 | 3  | 1  | -1 | 3  | 3  |
| 24 | 1  | -1 | 3  | 3  | -1 | -3 | 3  | -3 | -1 | -1 | 3  | -1 | 3  | -1 | -1 | 1  | 1  | 1  | 1  | -1 | -1 | -3 | -1 | 3  |
| 25 | 1  | -1 | 1  | -1 | 3  | -1 | 3  | 1  | 1  | -1 | -1 | -3 | 1  | 1  | -3 | 1  | 3  | -3 | 1  | 1  | -3 | -3 | -1 | -1 |
| 26 | -3 | -1 | 1  | 3  | 1  | 1  | -3 | -1 | -1 | -3 | 3  | -3 | 3  | 1  | -3 | 3  | -3 | 1  | -1 | 1  | -3 | 1  | 1  | 1  |
| 27 | -1 | -3 | 3  | 3  | 1  | 1  | 3  | -1 | -3 | -1 | -1 | -1 | 3  | 1  | -3 | -3 | -1 | 3  | -3 | -1 | -3 | -1 | -3 | -1 |

TABLE 2-continued

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

Hopping of the RS can be applied as follows.

A sequence group index u for each slot index $n_s$ can be defined based on a group hopping pattern $f_{gh}(n_s)$ and a sequence shift pattern $f_{ss}$ according to Equation 7.

$$u = (f_{gh}(n_s) + f_{ss}) \bmod 30 \quad \text{<Equation 7>}$$

There may be 17 different group hopping patterns and 30 different sequence shift patterns. Whether to apply group hopping may be indicated by a higher layer.

The PUCCH and the PUSCH may have the same group hopping pattern. The group hopping pattern $f_{gh}(n_s)$ can be defined by Equation 8.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{<Equation 8>}$$

In Equation 8, c(i) is a PN sequence, i.e., a pseudo-random sequence. The PN sequence can be defined by a length-31 gold sequence. Equation 9 shows an example of the gold sequence c(n).

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_1(n)) \bmod 2 \quad \text{<Equation 9>}$$

Herein, Nc is 1600, x(i) is a first m-sequence, and y(i) is a second m-sequence. For example, the first m-sequence or the second m-sequence may be initialized in each OFDM symbol according to a cell ID, a slot number in a radio frame, an OFDM symbol index in a slot, a CP type, etc. A pseudo-random sequence generator can be initialized as $$c_{init} = \left\lfloor \frac{N_{ID}^{cell}}{30} \right\rfloor$$

at the start of each radio frame.

The PUCCH and the PUSCH may have the same sequence shift pattern. The sequence shift pattern of the PUCCH can be given as $f_{ss}^{PUCCH} = N_{ID}^{cell} \bmod 30$. The sequence shift pattern of the PUSCH can be given as $f_{ss}^{PUSCH} = (f_{ss}^{PUCCH} + \Delta_{ss}) \bmod 30$, and $\Delta_{ss} \in \{0, 1, \ldots, 29\}$ can be configured by a higher layer.

Sequence hopping can be applied only to an RS sequence having a length greater than $6N_{sc}^{RB}$. In case of an RS having a length less than $6N_{sc}^{RB}$, a base sequence index v in a base sequence group is given to 0. In case of an RS having a length greater than or equal to $6N_{sc}^{RB}$, a base sequence index v in a base sequence group of a slot index $n_s$ can be defined by Equation 10.

$$v = \begin{cases} c(n_s) & \text{if group hopping is disabled and sequence hopping is enabled} \\ 0 & \text{otherwise} \end{cases} \quad \text{<Equation 10>}$$

c(i) can be expressed by the example of Equation 9. Whether to apply the sequence hopping can be indicated by a higher layer. A pseudo-random sequence generator can be initialized as $$c_{init} = \left\lfloor \frac{N_{ID}^{cell}}{30} \right\rfloor \cdot 2^5 + f_{ss}^{PUSCH}$$

at the start of each radio frame.

A DM-RS sequence for the PUSCH can be defined by Equation 11.

$$r_{PUSCH}^{(\lambda)}(m \cdot M_{sc}^{RS} + n) = w^{(\lambda)}(m) r_{u,v}^{(\alpha_\lambda)}(n)$$

In Equation 11, λ denotes a layer, and is any one of $\{0, 1, \ldots, v-1\}$. In addition, m=0,1, and n=0, ..., $M_{sc}^{RS} - 1$. $M_{sc}^{RS} = M_{sc}^{PUSCH}$, and a sequence $r_{u,v}^{(\alpha_\lambda)}(0), \ldots, r_{u,v}^{(\alpha_\lambda)}(M_{sc}^{RS} - 1)$ is defined by Equation 2.

An orthogonal sequence $w^{(\lambda)}(m)$ is given by $[w^{(\lambda)}(0) \; w^{(\lambda)}(1)] = [1 \; 1]$ for a DCI format 0 if a higher layer parameter (i.e., Activate-DMRS-with OCC) is not configured or if a temporary C-RNTI is used to transmit the latest uplink-related DCI for a transport block associated with corresponding PUSCH transmission, and otherwise it is given by a cyclic shift field included in the latest uplink-related DCI for the transport block associated with the corresponding PUSCH transmission as shown in the following table.

TABLE 3

| Cyclic Shift Field in uplink-related DCI format | $n_{DMRS,\lambda}^{(2)}$ | | | | $[w^{(\lambda)}(0) \; w^{(\lambda)}(1)]$ | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |

TABLE 3-continued

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

In the slot $n_s$, a cyclic shift value is given as $\alpha_\lambda = 2\pi n_{cs,\lambda}/12$, and $n_{cs,\lambda}$ can be defined by Equation 12.

$$n_{cs,\lambda} = (n_{DMRS}^{(1)} + n_{DMRS,\lambda}^{(2)} + n_{PN}(n_s)) \bmod 12 \quad \text{<Equation 12>}$$

In Equation 12, $n^{(2)}_{DMRS,\lambda}$ denotes a value given in Table 3 above according to a cyclic shift field for a DMRS included in the latest uplink-related DCI for the transport block associated with the corresponding PUSCH transmission, and $n^{(1)}_{DMRS}$ denotes a value given in Table 4 below according to a parameter 'cyclicShift' provided by a higher layer signal.

TABLE 4

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$n_{PN}(n_s)$ is given by the following equation.

$$n_{PN}(n_s) = \Sigma_{i=0}^{7} c(8N_{symb}^{UL} \cdot n_s + i) \cdot 2^i \quad \text{<Equation 13>}$$

In Equation 13, a pseudo-random sequence c(i) is defined by Equation 9. A pseudo-random sequence generator can be initialized as $$c_{init} = \left\lfloor \frac{N_{ID}^{cell}}{30} \right\rfloor \cdot 2^5 + f_{ss}^{PUSCH}$$

at the start of each radio frame.

A vector of RSs can be precoded by the following equation.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(v-1)} \end{bmatrix} \quad \text{<Equation 14>}$$

In Equation 14, P denotes the number of antenna ports used for PUSCH transmission. For PUSCH transmission using a single-antenna port, P=1, W=1, and v=1.

For spatial multiplexing, P=2 or P=4. A precoding matrix W may be identical to a precoding matrix used for the PUSCH in the same subframe.

As described above with reference to Equations 2 to 14, the existing DM-RS is generated based on a physical cell ID in a process of base sequence generation, and group hopping and sequence hopping.

The DM-RS generated through the aforementioned process is transmitted after being mapped to a physical resource.

Figure 7A:
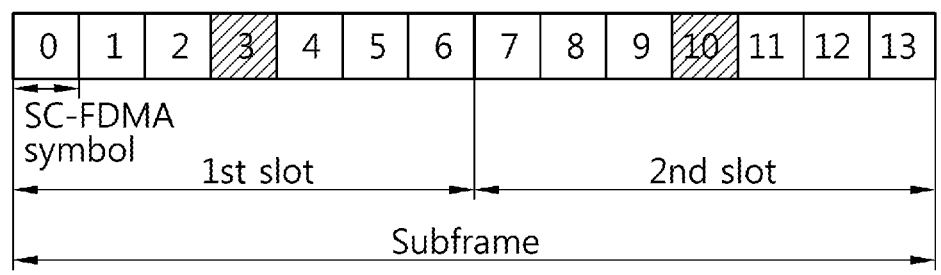

FIGS. 7a and 7b show an exemplary structure of a subframe in which an RS is transmitted.

The subframe structure of FIG. 7a is for a normal CP case. The subframe includes a $1^{st}$ slot and a $2^{nd}$ slot. Each of the $1^{st}$ slot and the $2^{nd}$ slot includes 7 SC-FDMA symbols. 14 SC-FDMA symbols in the subframe are indexed from 0 to 13. The RS can be transmitted by using SC-FDMA symbols indexed from 3 to 10. The RS can be transmitted by using a sequence. A ZC sequence can be used as an RS sequence. Various ZC sequences can be generated according to a root index and a cyclic shift value. A BS can estimate a channel of a plurality of UEs through an orthogonal sequence or a quasi-orthogonal sequence by allocating a different cyclic shift value to the UE. A location of a frequency domain occupied by the RS may be identical or different in two slots in the subframe. The same RS sequence is used in the two slots. Data can be transmitted through the remaining SC-FDMA symbols other than an SC-FDMA symbol in which the RS is transmitted. The subframe structure of FIG. 7b is for an extended CP case. The subframe includes a $1^{st}$ slot and a $2^{nd}$ slot. Each of the $1^{st}$ slot and the $2^{nd}$ slot includes 6 SC-FDMA symbols. 12 SC-FDMA symbols in the subframe are indexed from 0 to 11. The RS is transmitted through SC-FDMA symbols indexed from 2 to 8. Data is transmitted through the remaining SC-FDMA symbols other than an SC-FDMA symbol in which the RS is transmitted.

In MU-MIMO transmission, the same frequency band is allocated to multiple UEs by using a PUSCH resource when using the conventional method. In addition, when generating a DM-RS sequence, each UE applies a different cyclic shift value α and orthogonal code cover (OCC) value. According to this method, the most orthogonal DM-RS sequences are transmitted between the UEs. However, there are many UEs in a multi-node system, and each UE may have different uplink channel quality and a different uplink signal transmission amount. Therefore, it may be required to allocate a PUSCH resource having a different number of resource blocks to each UE.

For this, PUSCH resources each having a different number of resource blocks can be allocated to respective UEs, and there may be an overlapping (duplicated) region between the allocated PUSCH resources. That is, scheduling can be achieved such that MU-MIMO transmission is performed only in some of the PUSCH regions allocated to the respective UEs. In this case, if the UEs to which the overlapping PUSCH resources are allocated generate a DM-RS according to the conventional method, orthogonality is significantly impaired between sequences constituting the DM-RS.

Hereinafter, a D2D communication and a D2D Rx UE (or D2D receiving UE) will be described.

<D2D Communication and D2D Rx UE>

Figure 8:
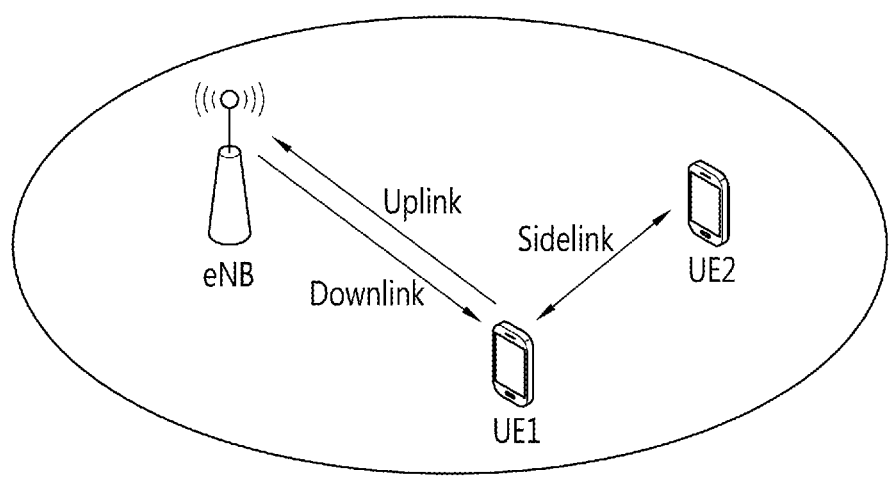
FIG. 8 shows an example of a D2D communication.

FIG. 8 shows an example of a D2D communication.

Referring to FIG. 8, an LTE or LTE-A system performs a communication through a downlink and an uplink between an eNB and a UE (i.e., a UE1 or a UE2). Among characteristics of recent LTE Release 12, a sidelink between the UE1 and the UE2 is defined as follows for device to device/proximity services (hereinafter, D2D/ProSE), and a demodulation reference signal and a synchronization signal are also defined as sidelink physical signals for the D2D communication.

PSBCH: Physical Sidelink Broadcast Channel
PSCCH: Physical Sidelink Control Channel
PSDCH: Physical Sidelink Discovery Channel
PSSCH: Physical Sidelink Shared Channel In the present specification, the content disclosed in the following Draft Spec is cited for detailed aspects of a sidelink of D2D.

TS 36.211: R1-150961
TS 36.212: R1-150959
TS 36.213: R1-150962

1. Summary of D2D/ProSE in Rel-12 (Release 12)
(The D2D work item of Rel-12 starts in RAN#63, and WID is approved in RP-140518).
(1) D2D Discovery
Discovery is not a required step for groupcast and broadcast communication.
For inter-cell discovery, synchronous and asynchronous cells deployments should both be taken into account.
A UE that transmits a discovery MAC PDU may also be a D2D Synchronization Source and therefore also transmit D2DSS. A UE transmitting a discovery MAC PDU, however, does not necessarily need to be a D2D Synchronization Source.
(2) D2D Communication
Initial requirement for the public safety services
Communication even outside network coverage
With no or limited interaction with the eNB
For the energy efficiency and low signaling overhead.
Delay sensitive VOIP is the main target.
(3) Discovery and Communication are Handled as Independent Operations in the Specification.
Discovery is not the pre-requisite of communication.
(4) D2D Physical Channel
D2D operates in UL resources: UL band in FDD, UL subframe in TDD
PUSCH structure is re-used.
SC-FDMA, one RS symbol per slot
D2D CP length is configured independently of the cellular CP length.
The last symbol is punctured.
P: To cope with potential subframe overlap
2. Resource Allocation of Discovery and SA (Scheduling Assignment) Signals.
A discovery resource consists of 2 contiguous PRB in frequency and is applicable to both normal and extended CP.
A scheduling assignment resource consists of one PRB in frequency and is applicable to both normal and extended CP.

Figure 9:
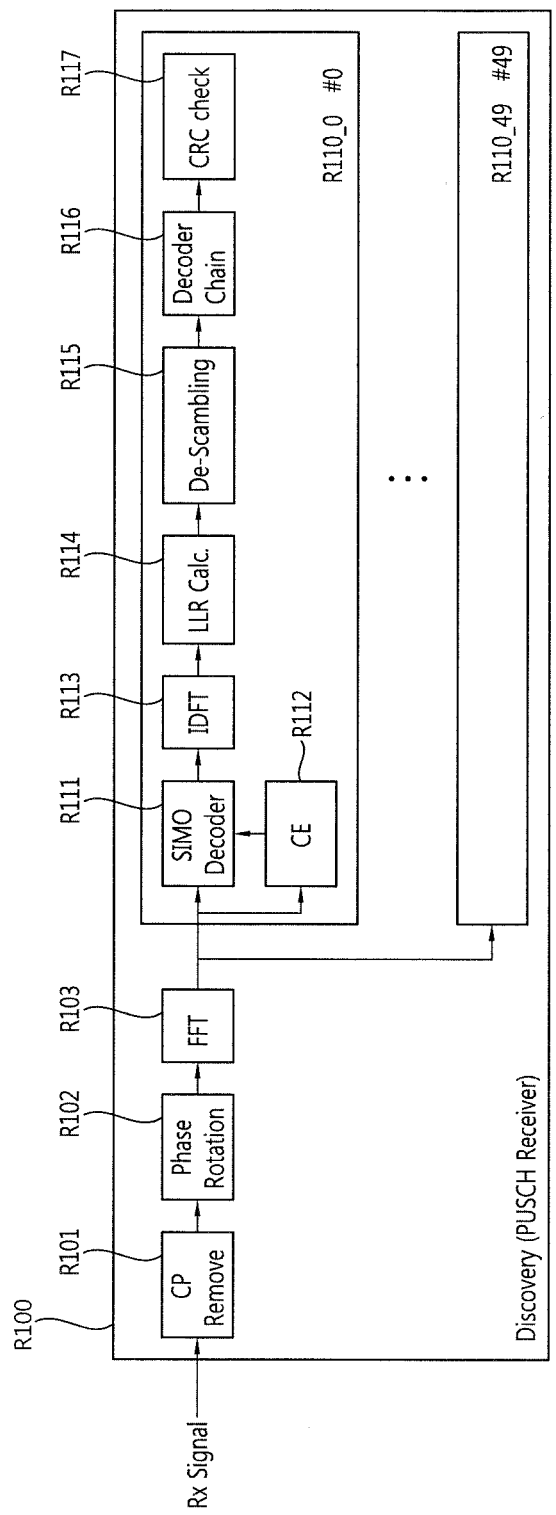
FIG. 9 shows an example of a D2D Rx UE structure.

FIG. 9 shows an example of a D2D Rx UE structure.

A UE for transmitting a D2D signal (hereinafter, a D2D Tx UE) may transmit a discovery signal by re-utilizing the existing PUSCH signal structure in a discovery resource pool. In this case, the discovery signal may be transmitted in two consecutive physical resource blocks (PRBs) in a frequency region.

A UE for receiving the D2D signal (hereinafter, a D2D Rx UE) may attempt blind detection by expecting that the discovery signal is received in the discovery resource pool.

Referring to FIG. 9, a typical D2D Rx UE R100 may include a CP removing unit R101 for removing a CP from an Rx signal, a phase rotation unit R102 for rotating a phase of the signal, and a fast Fourier transform (FFT) unit R103 for performing FFT on the signal. The D2D Rx UE R100 receives the Rx signals and removes a CP from the Rx signal, and thereafter performs FFT.

A signal processed by the FFT unit R103 is delivered to a plurality of decoding units R110_0 to R110_49 which perform decoding respectively for a plurality of frequency regions in which the Rx signal can be transmitted or detected for blind detection. As shown in FIG. 9, each of the plurality of decoding units R110_0 to R110_49 includes a channel estimation (CE) unit R112 for performing CE, a single input multiple output (SIMO) decoding unit R111 for performing decoding through a CE result obtained from the CE unit R112, an inverse discrete Fourier transform (IDFT) unit R113 for performing IDFT, a log-likelihood ratio (LLR) calculation unit R114 for calculating LLR, a de-scrambling unit R115 for de-scrambling a scrambled signal, a decoding chain unit R116, and a CRC checking unit R117 for checking CRC, and thus performs decoding for each of the plurality of frequency regions.

For example, if the Rx signal is a discovery signal, a frequency region processed by one decoding unit among the plurality of decoding units R110_0 to R110_49 may be two physical resource block (PRB) regions, and if the Rx signal is an SA signal, the frequency region processed by one decoding unit among the plurality of decoding units R110_0 to R110_49 may be one PRB region.

More specifically, the D2D Rx UE R100 may have to demodulate an Rx signal by the number of all cases in which the discovery signal can exist. For example, if it is assumed a case where a system bandwidth (BW) is 20 MHz (100 PRBs), the discovery signal is 2 PRBs, and thus the number of cases is 50 (if a granularity is 2 PRBs). Therefore, in order to demodulate the discovery signal, the D2D Rx UE R100 may have to employ 50 decoding units R110_0 to R110_49 as shown in FIG. 9 and thus perform demodulation on an Rx signal repetitively by 50 times for a plurality of frequency regions. Accordingly, an unnecessary computation of the UE may result in an increase in complexity and an increase in power consumption.

In addition, the SA signal may also operate with a similar method used in the discovery signal.

More specifically, the D2D Tx UE may transmit the SA signal by re-utilizing the existing PUSCH signal structure in an SA resource pool. In this case, the SA signal may be transmitted in 1 PRB in a frequency region.

The D2D Rx UE R100 may attempt blind detection by expecting that the SA signal will be received in the SA resource pool. Therefore, the D2D Rx UE R100 may have to demodulate an Rx signal by the number of all possible cases in which the SA can exist.

Unlike the discovery signal, the number of PRBs that can be allocated to a frequency region is 50 RBs in the SA signal. For example, if it is assumed a case where a system BW is 10 MHz (50 PRBs), the SA signal is 1 PRB, and thus the number of cases is 50 (if a granularity is 1 PRB). Therefore, in order to demodulate the SA signal, the D2D Rx UE R100 may have to employ 50 decoding units R110_0 to R110_49 as shown in FIG. 9 and thus perform demodulation on an Rx signal repetitively by 50 times for a plurality of frequency regions. Accordingly, an unnecessary computation of the UE may result in an increase in complexity and an increase in power consumption.

<Disclosure of the Present Specification>

Accordingly, a disclosure of the present specification aims to propose a method of solving the aforementioned problem.

In order to solve the aforementioned problem, the disclosure of the present disclosure proposes a receiving method in which demodulation is performed on a receive (Rx) signal only in some frequency regions selected from a plurality of frequency regions in which transmission is possible on the basis of signal quality for the Rx signal.

More specifically, in a method of receiving a D2D signal according to one disclosure of the present specification, the D2D Rx UE R100 may receive a discovery signal or scheduling assignment (SA) signal used in the D2D communication from the D2D Tx UE, measures signal quality for each of a plurality of physical resource block (PRB) regions included in a frequency region in which the received signal can be transmitted, chooses a candidate PRB region for which demodulation is performed among the plurality of PRB regions on the basis of the measured signal quality, and performs demodulation on the candidate PRB region.

The D2D Rx UE R100 may perform demodulation on the candidate PRB region on the basis of single carrier frequency division multiple access (SC-FDMA).

In particular, the D2D Rx UE R100 may measure the signal quality for each of the plurality of PRB regions on the basis of signal strength of the received signal for each of the plurality of PRB regions, a least square (LS) channel estimation scheme, or signal strength of an estimated channel.

Hereinafter, a disclosure of the present specification is described in detail.

Figure 10:
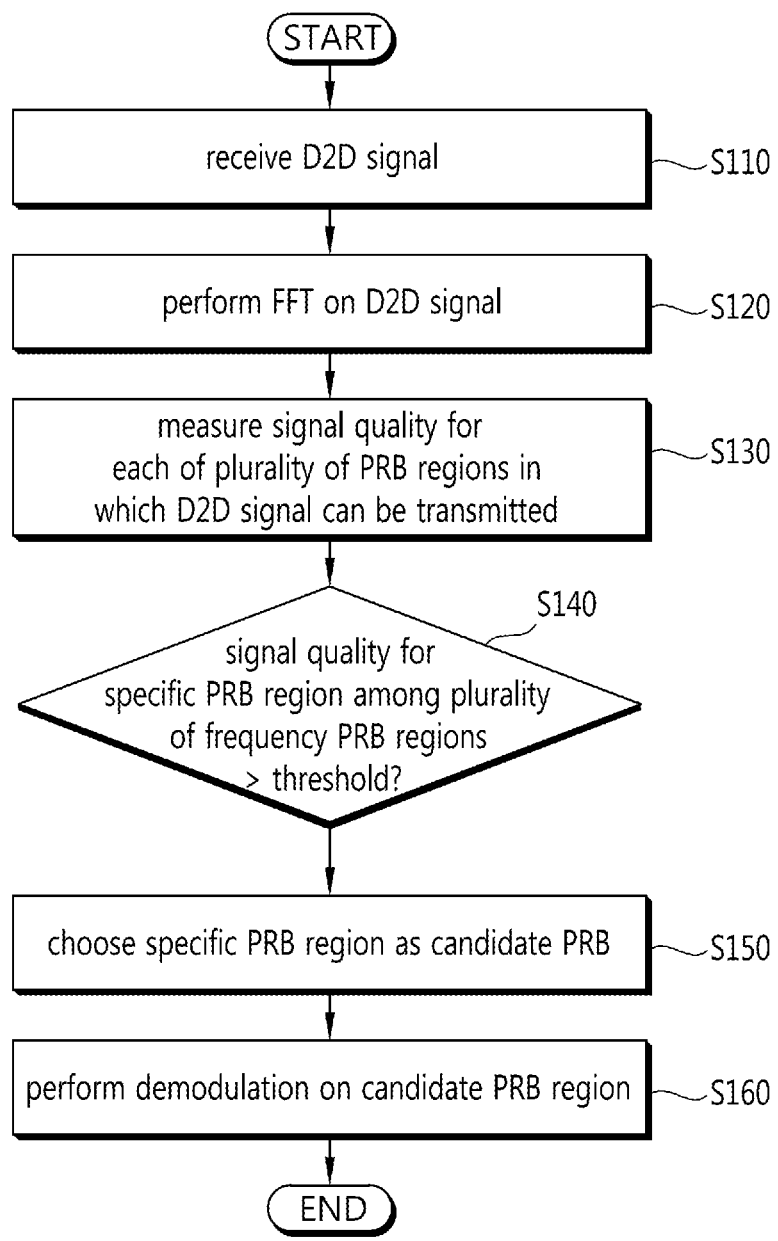
FIG. 10 is a flowchart showing a receiving method according to one disclosure of the present specification.

FIG. 10 is a flowchart showing a receiving method according to one disclosure of the present specification.

Referring to FIG. 10, the receiving method according to the disclosure of the present specification may be achieved in the following steps.

First, the D2D Rx UE R100 may receive a D2D signal from a D2D Tx UE (S110). Herein, the D2D signal may be the aforementioned discovery signal or SA signal.

Next, the D2D Rx UE R100 may perform FFT on the D2D signal (S120).

Next, after the FFT, the D2D Rx UE R100 may measure signal quality for each of a plurality of PRB regions in which the D2D signal can be transmitted (S130).

Herein, the signal quality for each of the plurality of PRB regions may be measured on the basis of signal strength of an Rx signal for each of the plurality of PRB regions, a least square (LS) channel estimation scheme, or signal strength of an estimated channel. A method of measuring the signal quality for each of the plurality of PRB regions is described below in detail.

Next, the D2D Rx UE R100 may compare signal quality for each of the plurality of PRB regions with a pre-set threshold or a reference signal (S140).

If signal quality for a specific PRB region among the plurality of PRB regions is greater than the threshold, the D2D Rx UE R100 may be chosen as a candidate PRB region for demodulating the specific PRB region and may register it to a database (DB) (S150).

However, if the signal quality for the specific PRB region among the plurality of PRB regions is less than the threshold, the D2D Rx UE R100 may regard that a discovery signal or an SA signal does not exist in the PRB region.

Next, the D2D Rx UE R100 may perform demodulation on the candidate PRB region registered to the DB.

Herein, the D2D Rx UE R100 may perform demodulation on the candidate PRB region on the basis of SC-FDMA. That is, the D2D Rx UE R100 may operate as an SC-FDMA receiver as to the candidate PRB region.

Figure 11:
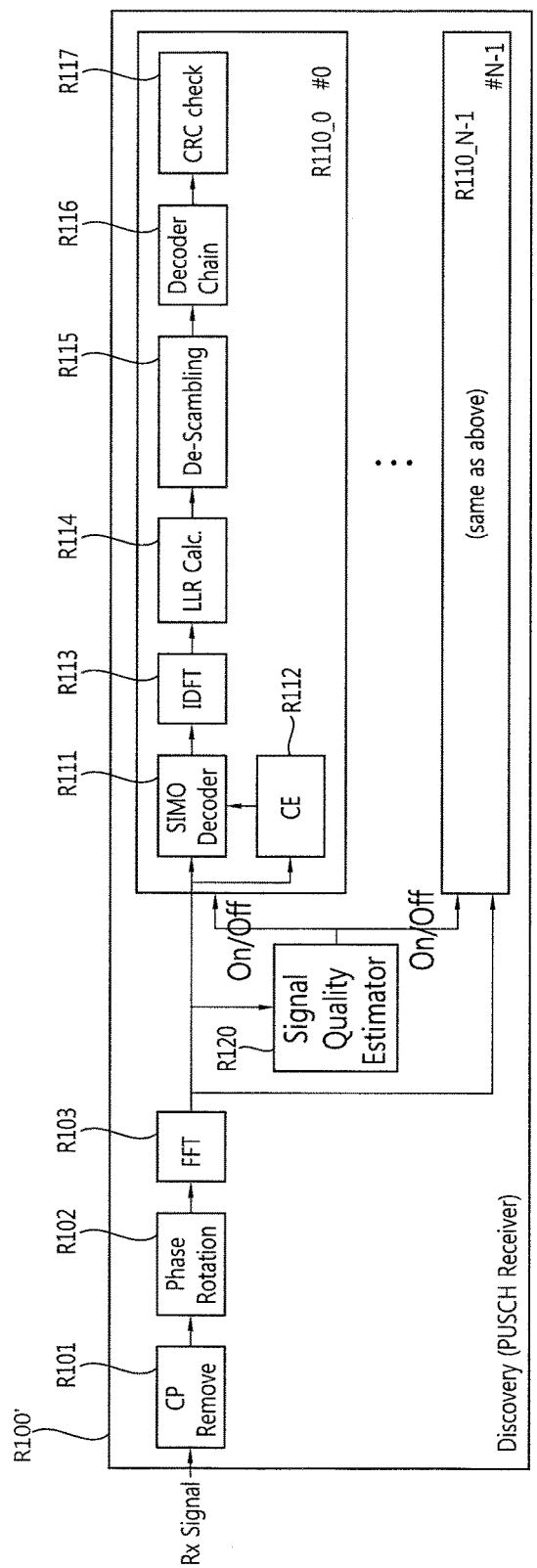
FIG. 11 shows a structure of a D2D Rx UE according to one disclosure of the present specification.

FIG. 11 shows a structure of a D2D Rx UE according to one disclosure of the present specification.

Referring to FIG. 11, the D2D Rx UE R100' according to the disclosure of the present specification may further include a signal quality estimator R120 in comparison with the typical D2D Rx UE R100.

In the D2D Rx UE R100' according to the disclosure of the present specification, the remaining constitutional elements other than the signal quality estimator R120 are similar to a typical SC-FDMA receiver. Therefore, a method of measuring signal quality by the signal quality estimator RI 20 will be described hereinafter in detail.

1. First Method: Signal Quality Measurement Based on Signal Strength

In the first method, signal quality is measured by using an Rx signal level in a PRB region to which a discovery signal or an SA signal is assigned.

The first method uses a characteristic in which the Rx signal level of the PRB region (e.g., a PRB pair) to which the discovery signal or the SA signal is assigned is greater than an Rx signal of a different PRB region to which the signal is not assigned. A signal quality metric $Q_n$ based on the first method may be as follows.

$$Q_n = \sum_{k=0}^{K_n-1} |Y_n(k)|^2 \quad [\text{Equation 15}]$$

Herein, $K_n$ and $Y_n(k)$ respectively denote the total number of REs in an n-th PRB region (e.g., a PRB pair) and an Rx signal in a k-th RE.

In addition, the first method can also be used when a plurality of SC-FDMA symbols are present in one subframe.

2. Second Method: Signal Quality Measurement Based on Noise Averaging

The second method is a method of measuring signal quality based on least square (LS) channel estimation using a product of an Rx signal and a complex conjugate signal of a reference signal known to a receiving end. In this case, a noise component is included in an estimated channel.

The second method uses a characteristic in which a noise component becomes 0 when applying an expectation of a channel estimated under the assumption that a noise is an additive white Gaussian noise (AWGN). A signal quality metric $Q_n$ based on the second method may be as follows.

$$Q_n = \left| \sum_{k=0}^{K_n-1} Y_n(k) X_n^*(k) \right|^2 \quad [\text{Equation 16}]$$

Herein, X(k) denotes a DRS of a k-th RE, where $E\lfloor |X_n(k)|^2 \rfloor = 0$.

In addition, the second method can also be used when a plurality of DRS symbols are present in one subframe.

3. Third Method: Signal Quality Measurement Based on Signal Strength of Reference Signal The third method uses a characteristic in which signal strength of a channel experienced by an actually received signal is greater than signal strength of a channel estimated in a PRB region (e.g., a PRB pair). A signal quality metric $Q_n$ based on the third method may be as follows.

$$Q_n = \sum_{k=0}^{K_n-1} |\hat{H}_n(k)|^2 \qquad \text{[Equation 17]}$$

Herein, $\hat{H}_n(k)$ denotes a frequency response of a channel estimated in a DRS symbol of a k-th RE in a state where a noise is removed.

Various channel estimation methods may be used to estimate $\hat{H}_n(k)$ in which a noise is removed. Representative examples thereof may include a DFT-based channel estimation method, a minimum mean square error (MMSE) channel estimation method, or the like.

Thereafter, if signal quality detected using the signal quality measurement or the signal quality estimation is greater than a pre-set or determined threshold, the D2D Rx UE R100' according to the disclosure of the present specification may choose a corresponding PRB region as a candidate PRB region, and may perform demodulation based on SC-FDMA as to the candidate PRB region. That is, the D2D Rx UE R100' may operate as a receiver based on SC-FDMA for performing demodulation on the candidate PRB region.

Figure 12:
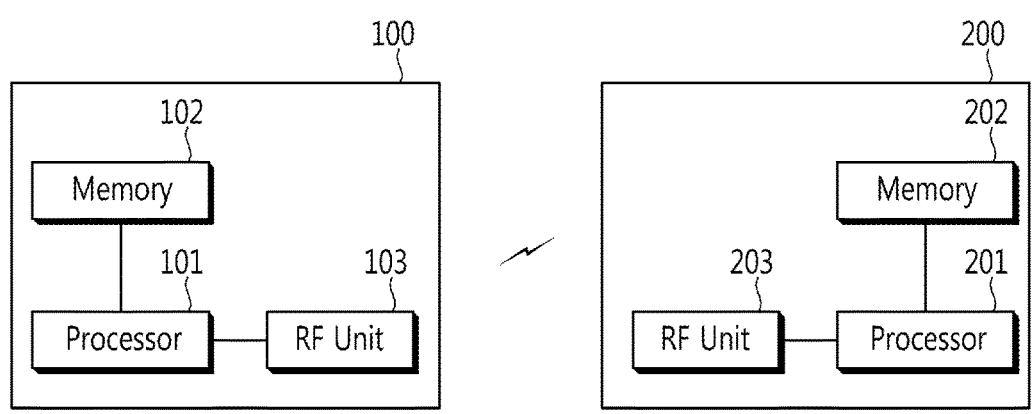
FIG. 12 is a block diagram illustrating a wireless communication system according to an embodiment of the present invention.

FIG. 12 is a block diagram illustrating a wireless communication system according to an embodiment of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

A wireless device 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method. An operation of the wireless 100 according to the above embodiment may be implemented by the processor 201.

According to one disclosure of the present specification, the aforementioned problem of the conventional technique is solved. More specifically, according to the disclosure of the present specification, on the basis of signal quality for a receive (Rx) signal in D2D communication, demodulation is performed on the Rx signal only in some frequency regions selected among a plurality of frequency regions in which transmission is possible. Therefore, advantageously, there is a decrease in complexity and power consumption of a receiver.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method of receiving a signal by a terminal for performing a device-to-device (D2D) communication, the method comprising:
   measuring signal quality over a plurality of physical resource block (PRB) regions;
   choosing a candidate PRB region for which demodulation is performed among the plurality of PRB regions based on the measured signal quality; and
   performing demodulation only on a signal for the chosen candidate PRB region based on the measured signal quality,
   wherein the signal is a discovery signal or a scheduling assignment (SA) signal received from another terminal, and
   wherein measuring the signal quality comprises:
      marking a PRB region as the candidate PRB region if the signal quality is greater than or equal to a threshold; and
      determining that the discovery signal or the SA signal does not exist in the PRB region if the signal quality is less than the threshold.

2. The method of claim 1, wherein the demodulation is performed only on the signal for the chosen candidate PRB region based on single carrier frequency division multiple access (SC-FDMA).

3. The method of claim 1, further comprising performing fast Fourier transform (FFT) on the signal for the chosen candidate PRB region.

4. The method of claim 1, wherein the signal quality over the plurality of PRB regions is measured based on a signal strength of the signal for each of the plurality of PRB regions, a least square (LS) channel estimation scheme, or a signal strength of an estimated channel.

5. A terminal for performing a device-to-device (D2D) communication, the terminal comprising:
   a radio frequency (RF) unit configured to communicate with another terminal; and
   a processor configured to:
      measure signal quality over a plurality of physical resource block (PRB) regions,
      choose a candidate PRB region for which demodulation is performed among the plurality of PRB regions based on the measured signal quality, and
      perform demodulation only on a signal for the chosen candidate PRB region based on the measured signal quality,
   wherein the signal is a discovery signal or a scheduling assignment (SA) signal received from the another terminal, and wherein the processor is further configured to:
- mark a PRB region as the candidate PRB region if the signal quality is greater than or equal to a threshold, and
- determine that the discovery signal or the SA signal does not exist in the PRB region if the signal quality is less than the threshold.

6. The terminal of claim 5, wherein the processor performs demodulation only on the signal for the chosen candidate PRB region based on single carrier frequency division multiple access (SC-FDMA).

7. The terminal of claim 5, wherein the processor performs fast Fourier transform (FFT) on the signal for the chosen candidate PRB region.

8. The terminal of claim 5, wherein the processor measures the signal quality over the plurality of PRB regions based on a signal strength of the signal for each of the plurality of PRB regions, a least square (LS) channel estimation scheme, or a signal strength of an estimated channel.

* * * * *